United States Patent
Yoshida et al.

(10) Patent No.: US 10,071,774 B2
(45) Date of Patent: Sep. 11, 2018

(54) JOINING STRUCTURE FOR MEMBER IN VEHICLE BODY

(71) Applicant: NIPPON STEEL & SUMITOMO METAL CORPORATION, Tokyo (JP)

(72) Inventors: Michitaka Yoshida, Amagasaki (JP); Atsushi Tomizawa, Nago (JP); Kazuo Uematsu, Futtsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/313,908

(22) PCT Filed: May 25, 2015

(86) PCT No.: PCT/JP2015/064917
§ 371 (c)(1),
(2) Date: Nov. 23, 2016

(87) PCT Pub. No.: WO2015/182549
PCT Pub. Date: Dec. 3, 2015

(65) Prior Publication Data
US 2017/0197669 A1 Jul. 13, 2017

(30) Foreign Application Priority Data
May 27, 2014 (JP) ................................. 2014-109363

(51) Int. Cl.
*B62D 27/02* (2006.01)
*F16B 5/08* (2006.01)
(Continued)

(52) U.S. Cl.
CPC ............ *B62D 27/023* (2013.01); *B21D 7/08* (2013.01); *B21D 7/162* (2013.01); *B23K 9/0026* (2013.01);
(Continued)

(58) Field of Classification Search
None
See application file for complete search history.

(56) References Cited

U.S. PATENT DOCUMENTS 7,762,622 B2 *   7/2010   Lakic ..................... B62D 25/04
                                                     296/193.06
8,136,871 B2 *   3/2012   Yoshida ................... B21D 7/08
                                                     293/122
(Continued)

FOREIGN PATENT DOCUMENTS

CN       102941880 A       2/2013
EP       1 857 195 A1      11/2007
(Continued)

OTHER PUBLICATIONS

Russian Search Report for counterpart Russian Application No. 2016145936/11, dated Jun. 15, 2017, with an English translation.
(Continued)

*Primary Examiner* — Jonathan Peter Masinick
(74) *Attorney, Agent, or Firm* — Birch, Stewart, Kolasch & Birch, LLP

(57) ABSTRACT

Not only a reduction in the load resistant performance of a structural member in a vehicle body having a quenched portion with a tensile strength of 1,470 MPa or greater, but also a reduction in the shock absorbing performance associated with the HAZ softening by welding are suppressed. In a joining structure (10) for a member in a vehicle body in which a first member (11) that is made of steel, has a closed hollow cross-section having no outward flange, and is provided with a quenched portion having a tensile strength of 1,470 MPa or greater, a base material portion having a tensile strength of less than 700 MPa, and a transition portion (17) between the quenched portion (16) and the base material portion (18) in a longitudinal direction thereof, and a second member (12) that is made of steel and overlaps the
(Continued)

first member (11) are welded to each other in an overlapping portion, the overlapping portion exists over the base material portion (18) from the quenched portion (16) of the first member (11) through the transition portion (17), and a welding portion (13) formed by welding exists in the transition portion (17) or the base material portion (18) in the first member (11).

6 Claims, 5 Drawing Sheets

(51) Int. Cl.
| | |
|---|---|
| B21D 7/08 | (2006.01) |
| B21D 7/16 | (2006.01) |
| B23K 9/00 | (2006.01) |
| B23K 11/00 | (2006.01) |
| B23K 26/24 | (2014.01) |
| B62D 25/04 | (2006.01) |
| B62D 25/06 | (2006.01) |
| B62D 65/02 | (2006.01) |
| B23K 11/11 | (2006.01) |
| B23K 26/21 | (2014.01) |
| B23K 31/02 | (2006.01) |
| C21D 1/18 | (2006.01) |
| B23K 101/00 | (2006.01) |

(52) U.S. Cl.
CPC ............ B23K 11/002 (2013.01); B23K 26/24 (2013.01); F16B 5/08 (2013.01); B23K 9/00 (2013.01); B23K 11/11 (2013.01); B23K 26/21 (2015.10); B23K 31/02 (2013.01); B23K 2201/006 (2013.01); B62D 25/04 (2013.01); B62D 25/06 (2013.01); B62D 65/02 (2013.01); C21D 1/18 (2013.01)

(56) References Cited

U.S. PATENT DOCUMENTS

| | | | |
|---|---|---|---|
| 8,444,211 B2* | 5/2013 | Fujita .................. | B62D 21/152 296/187.05 |
| 2010/0084892 A1 | 4/2010 | Yoshida et al. | |
| 2013/0187409 A1* | 7/2013 | Moll ..................... | B62D 25/04 296/193.06 |
| 2013/0187410 A1* | 7/2013 | Wawers ............... | B62D 21/157 296/193.06 |
| 2014/0147693 A1* | 5/2014 | Yasuyama ........... | B21D 35/007 428/594 |
| 2014/0191536 A1* | 7/2014 | Elfwing ................ | B62D 25/04 296/193.06 |
| 2015/0174702 A1 | 6/2015 | Fujimoto et al. | |
| 2016/0016610 A1* | 1/2016 | Okada ................... | B23K 26/22 219/121.64 |
| 2017/0247774 A1* | 8/2017 | Sachdev ............... | B23K 26/38 |

FOREIGN PATENT DOCUMENTS

| | | |
|---|---|---|
| EP | 2 143 621 A1 | 1/2010 |
| EP | 2236395 A1 | 10/2010 |
| JP | 2007-83304 A | 4/2007 |
| JP | 2008-56371 A | 3/2008 |
| JP | 4825019 B2 | 11/2011 |
| JP | 2012-25335 A | 2/2012 |
| JP | 2014-24074 A | 2/2014 |
| RU | 47816 U1 | 9/2005 |
| WO | WO 2008/123506 A1 | 10/2008 |
| WO | WO 2014/024997 A1 | 2/2014 |

OTHER PUBLICATIONS

International Search Report for PCT/JP2015/064917 (PCT/ISA/210) dated Aug. 18, 2015.
Written Opinion of the International Searching Authority for PCT/JP2015/064917 (PCT/ISA/237) dated Aug. 18, 2015.
Extended European Search Report for corresponding European Application No. 15800283.2, dated Jan. 29, 2018.
Chinese Office Action and Search Report for counterpart Application No. 201580027109.7, dated Apr. 2, 2018, with an English translation of the Search Report.

* cited by examiner

JOINING STRUCTURE FOR MEMBER IN VEHICLE BODY

TECHNICAL FIELD OF THE INVENTION

The present invention relates to a joining structure for a member in a vehicle body.

RELATED ART

FIG. 6 is an illustration showing the three-dimensional hot bending and quench (3DQ) disclosed in Patent Documents 1 and 2 by the present applicant.

In the three-dimensional hot bending and quench, as shown in FIG. 6, while being supported by support rolls 2 and fed by a feeding device 3 in an axial direction, a long steel material 1 is rapidly heated to a temperature of an $Ac_3$ point or higher by a high-frequency heating coil 4 to partially form a high-temperature portion 1a, and immediately after this, it is rapidly cooled by a water cooling device (not shown).

Accordingly, in the steel material 1, an ultrahigh-strength portion is formed that has been quenched during moving in the longitudinal direction. In addition, by two-dimensional or three-dimensional displacement of a movable roller dice 5 that feeds and supports the steel material 1 on the orthogonal coordinate system, a bending moment or shear force is imparted to the high-temperature portion 1a of the above-described steel material 1, and thus a bent portion is formed. By rapidly cooling the bent high-temperature portion 1a, a bent member 6 having the bent portion quenched is manufactured by three-dimensional hot bending and quench.

The present applicant discloses that a strength member or an A-pillar of a vehicle body is manufactured by three-dimensional hot bending and quench in Patent Document 3.

A steel structural member of a vehicle body is joined to another member (another structural member or panel part) mainly by welding such as spot welding, arc welding, or laser welding. The tensile strength of the quenched portion of the structural member manufactured by three-dimensional hot bending and quench reaches over 1,470 MPa. Therefore, in a case where this structural member is welded to another member by the quenched portion, a phenomenon (so-called HAZ softening) in which martensite is annealed and hardness is thus reduced occurs. In a case where the structural member in which the HAZ softening has occurred is subjected to a shock load, the structural member is broken with the HAZ-softened portion as a starting point. Therefore, the excellent shock absorbing performance that the structural member originally has is not sufficiently exhibited.

As a measure of this, it is considered that a portion (in this specification, referred to as "base material portion") having almost the same tensile strength as that of the base material is formed by partially adjusting the cooling rate of the high-temperature portion 1a or by performing no heating in the three-dimensional hot bending and quench, without performing partial quenching on a part of the structural member that is manufactured by three-dimensional hot bending and quench. The HAZ softening is prevented by welding the base material portion of the structural member manufactured by three-dimensional hot bending and quench to another member.

In this measure, part of the structural member is provided with the base material portion together with the quenched portion, and thus there is a concern that the load resistant performance of the structural member may be reduced.

PRIOR ART DOCUMENT

Patent Documents

[Patent Document 1] Japanese Patent No. 4825019
[Patent Document 2] Japanese Unexamined Patent Application, First Publication No. 2012-25335
[Patent Document 3] PCT/JP/2008/056371

DISCLOSURE OF THE INVENTION

Problems to be Solved by the Invention

It has not been known that a joining structure for a member in a vehicle body capable of suppressing a reduction in the shock absorbing performance associated with the HAZ softening due to welding without reducing the load resistant performance of the structural member of the vehicle body having a quenched portion with a tensile strength of 1,470 MPa or greater has not been known.

Means for Solving the Problem

The invention is as follows.

(1) A joining structure for a member in a vehicle body including: a first member that is made of steel, has a closed hollow cross-section that is free of an outwardly-extending flange, extends in one direction, and is provided with a quenched portion having a tensile strength of 1,470 MPa or greater, a base material portion having a tensile strength of less than 700 MPa, and a transition portion between the quenched portion and the base material portion in which a tensile strength gradually changes from the tensile strength of the quenched portion to the tensile strength of the base material portion; and a second member that is made of steel and partially overlaps an external surface of the first member by an overlapping portion, in which the first member and the second member are welded to each other in the overlapping portion, the overlapping portion exists over the base material portion from the quenched portion of the first member through the transition portion, and a welding portion formed by the welding exists in the transition portion or the base material portion in the first member.

(2) The joining structure for a member in a vehicle body according to (1), in which a ratio (X/L) of a length X (mm) to a length L (mm) is 0.25 or greater, the length X (mm) being a length from an end portion of the second member on a side facing the quenched portion of the first member to an end portion of the quenched portion of the first member in the one direction, the length L (mm) being a length from an end portion of the welding portion on a side facing the quenched portion of the first member to the end portion of the second member on the side facing the quenched portion of the first member.

The length X is indicated by the coordinates to the one direction as the origin position of the end portion of the second member on the side facing the quenching portion of the first member.

(3) The joining structure for a member in a vehicle body according to (1) or (2), in which the welding portion is an arc welding portion, a laser welding portion, or a resistance spot welding portion.

(4) The joining structure for a member in a vehicle body according to any one of (1) to (3), in which the first member has a rectangular cross-sectional shape, and the second member is formed of a third member having a hat-shaped cross-section overlapping three sides of the first member and a fourth member joined to overlap two flanges of the third member and overlapping the remaining one side of the first member.

(5) The joining structure for a member in a vehicle body according to any one of (1) to (4), in which the second member has a joining hole that is a work hole for a case where the welding portion is formed.

(6) The joining structure for a member in a vehicle body according to any one of (1) to (5), in which the first member is manufactured by three-dimensional hot bending and quench.

Effects of the Invention

By applying a joining structure for a member in a vehicle body according to the invention to, for example, a joining portion between an A-pillar and a side sill, a joining portion between an A-pillar and a roof rail, a door beam and its mounting portion, or the like, it is possible to suppress a reduction in the shock absorbing performance associated with the HAZ softening by welding without reducing the load resistant performance of the structural member of the vehicle body having a quenched portion with a tensile strength of 1,470 MPa or greater.

BRIEF DESCRIPTION OF THE DRAWINGS

FIG. 1A is a perspective view, FIG. 1B is a cross-sectional view taken along line A-A' in FIG. 1A, and FIG. 1C is a graph showing tensile strengths of a quenched portion, a transition portion, and a base material portion of a first member.

EMBODIMENTS OF THE INVENTION

Hereinafter, a joining structure for a member in a vehicle body according to the invention will be described with reference to the accompanying drawings.

Figure 1:
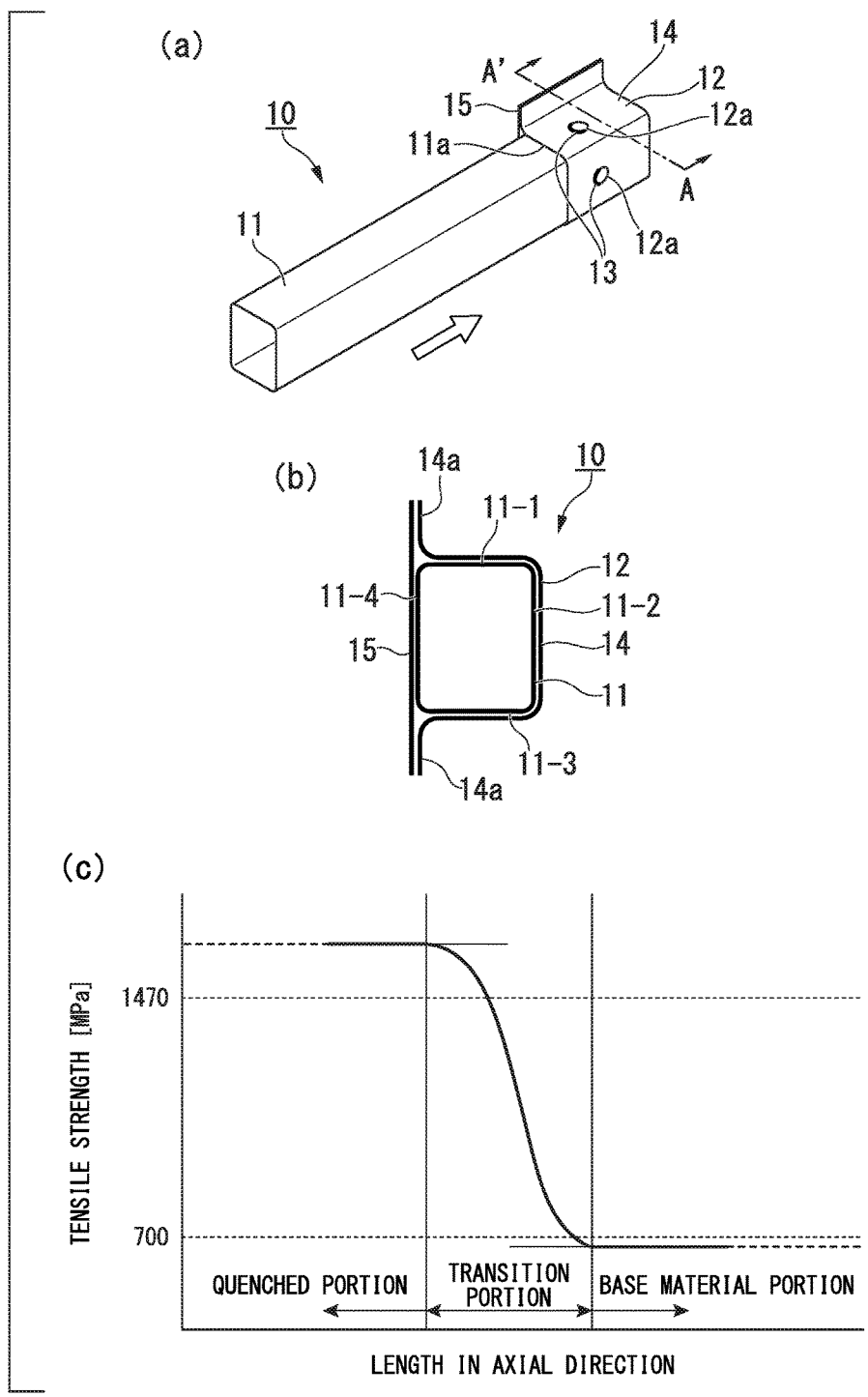
FIG. 1 shows illustrations showing a joining structure for a member in a vehicle body according to the invention.

FIG. 1 shows illustrations showing a joining structure 10 for a member in a vehicle body according to the invention. FIG. 1A is a perspective view, FIG. 1B is a cross-sectional view taken along line A-A' in FIG. 1A, and FIG. 1C is a graph showing tensile strengths of a quenched portion, a transition portion, and a base material portion of the first member 11. FIG. 1B shows a center position of each structural member in a plate thickness direction.

As shown in FIGS. 1A and 1B, the joining structure 10 according to the invention has a first member 11 and a second member 12.

Figure 6:
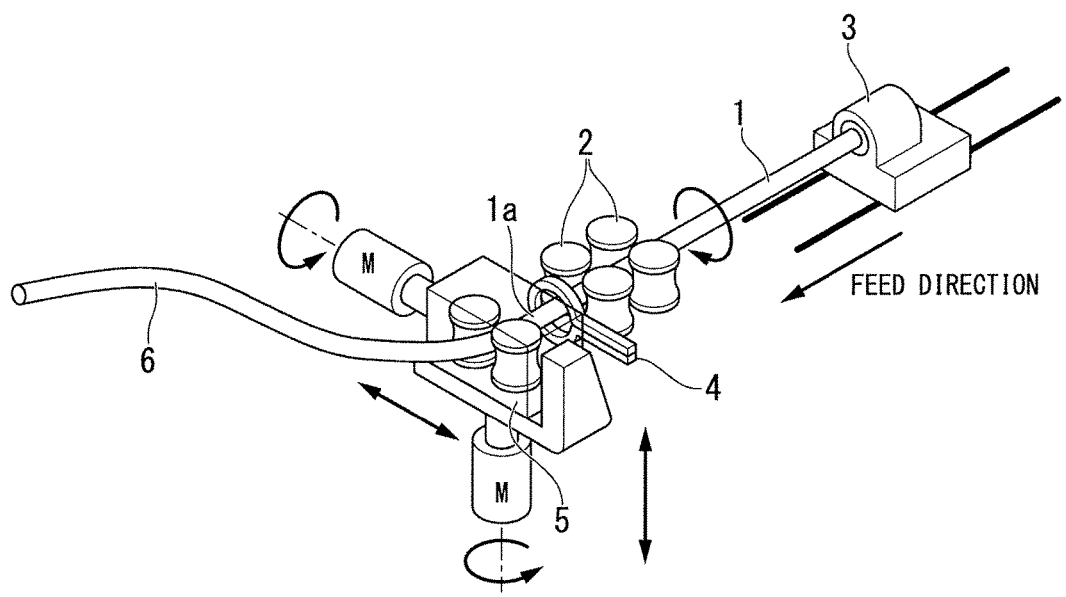
FIG. 6 is an illustration showing three-dimensional hot bending and quench.

The first member 11 is manufactured by the three-dimensional hot bending method described with reference to FIG. 6. A bent portion of the first member 11 is omitted in order to make the drawing more visible.

The first member 11 has a closed hollow cross-sectional shape having no outward flange. In the example of FIG. 1, the first member 11 is a member obtained by processing a so-called square steel pipe, and has a quadrangular (rectangular) cross-sectional shape.

The cross-sectional shape of the first member 11 is not limited to the quadrangular shape. The first member 11 may have a polygonal cross-sectional shape other than the quadrangular shape, such as a triangular shape or a pentagonal shape. It may have an annular or elliptical cross-sectional shape, or a cross-sectional shape obtained by partially combining the above shapes.

The first member 11 is a steel member extending in one direction (in a direction of the void arrow in FIG. 1A). The first member 11 is provided with a quenched portion, a transition portion, and a base material portion, that are arranged in this order in one direction, as shown in FIG. 1C. The quenched portion, the transition portion, and the base material portion will be further described with reference to FIG. 3 to be described later.

The quenched portion has a metal structure composed of martensite and has a tensile strength of 1,470 MPa or greater. The base material portion has a tensile strength of less than 700 MPa. The transition portion is a transition area between the quenched portion and the base material portion in which a tensile strength gradually changes from the tensile strength of the quenched portion to the tensile strength of the base material portion.

The first member 11 is produced by three-dimensional hot bending and quench using, as a raw pipe, a welded steel pipe formed from a thin steel plate (steel sheet). The thin steel plate is subjected to design adjustment of steel components and the like by quenching so as to obtain desired hardness. The strength of the thin steel plate is generally about 700 MPa or less in consideration of processing into the welded pipe.

The second member 12 is made of steel and partially overlaps an external surface 11a of the first member 11 in one direction. This overlapping portion exists over the base material portion from the quenched portion of the first member through the transition portion.

The second member 12 has a welding portion 13 joined to the first member 11 in the overlapping portion of the first member 11 and the second member 12. The welding portion 13 is an arc welding portion, but is not limited thereto. It may be a laser welding portion or a resistance spot welding portion.

The second member 12 is formed of a third member 14 and a fourth member 15. The third member 14 has a hat-shaped cross-sectional shape overlapping three sides 11-1, 11-2, and 11-3 of the first member 11 and having two outward flanges 14a. The fourth member 15 is a so-called closing plate. The fourth member 15 is joined to overlap the two flanges 14a of the third member 14 and is joined by welding in a state of overlapping the remaining one side 11-4 of the first member 11.

The second member 12 has joining holes 12a that are work holes for welding to the first member 11 in upper, lower, left, and right surfaces thereof, and is arc-welded to the first member 11 at the edges of the joining holes 12a.

As described above, the joining structure 10 according to the invention has a structure in which the first member 11 is held by the second member 12, and by arc-welding the edges of the joining holes 12a provided in the upper, lower, left, and right surfaces of the second member 12, the second member 12 is joined to the first member 11.

The welding portion 13 of the joining structure 10 exists only in the transition portion or the base material portion of the first member 11. Accordingly, the joining structure 10 can suppress a reduction in the shock absorbing performance associated with the HAZ softening by welding without reducing the load resistant performance of the structural member of the vehicle body having a quenched portion with a tensile strength of 1,470 MPa or greater. The reason for this will be described.

Figure 2:
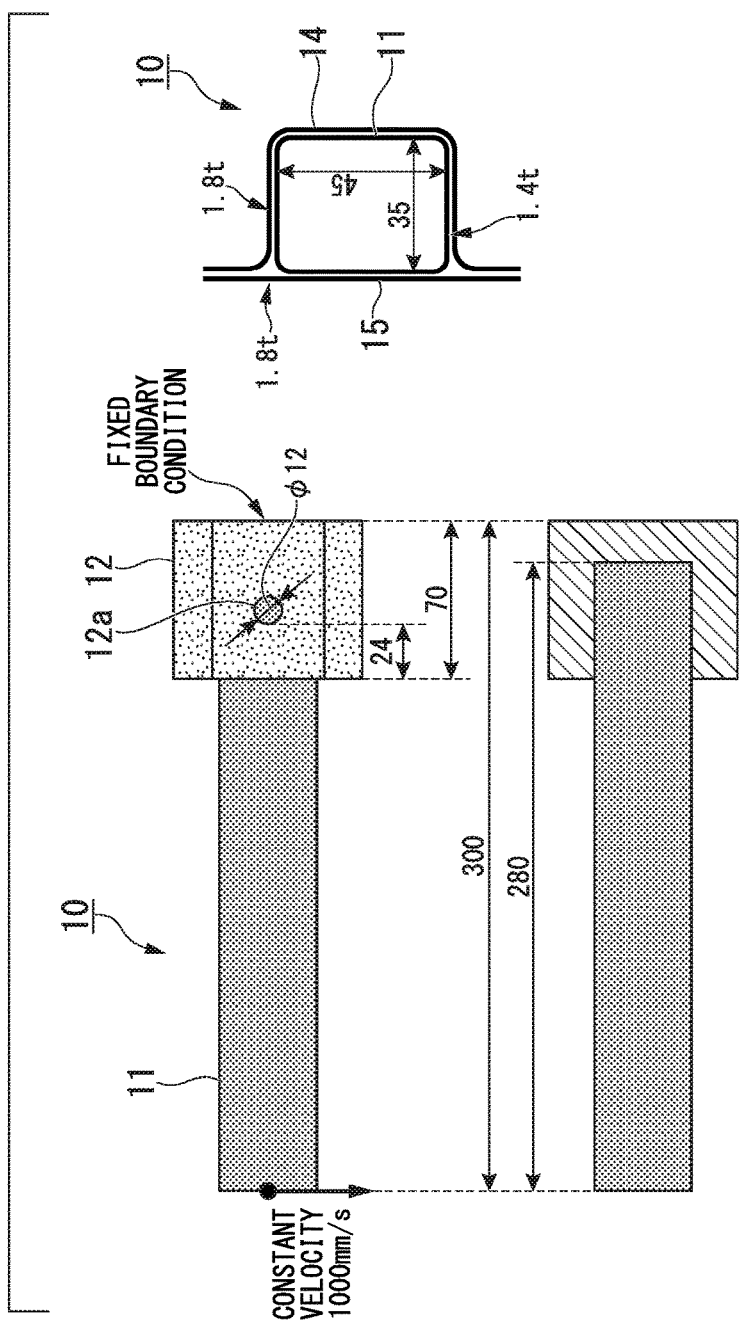
FIG. 2 is an illustration showing conditions of FEM analysis performed by the inventors on a welding joint for a vehicle body having the structure shown in FIGS. 1A and 1B.

FIG. 2 is an illustration showing conditions of FEM analysis performed on the joining structure 10 having the structure shown in FIGS. 1A and 1B.

As described above, in a case where the second member 12 is joined to the first member 11 with the position of the first member 11 corresponding to the joining hole 12a of the second member 12 as the base material portion, a strength difference by HAZ softening can be avoided, and thus it is possible to suppress a concern about breaking of the first member 11 by stress concentration at the time of application of a shock load.

However, in a case where the base material that is provided in the first member 11 is increased in the axial direction, the load resistant performance may be reduced. Accordingly, regarding the portion in which the first member 11 and the second member 12 overlap each other in the joining structure 10 having the structure shown in FIGS. 1A and 1B, a quenching length and load resistance performance were examined by FEM analysis under the analysis conditions shown in FIG. 2.

As shown in FIG. 2, the first member 11 has an overall length of 280 mm, a rectangular cross-sectional shape of 35×45 mm, and a plate thickness of 1.4 mm. The second member 12 is formed of the third and fourth members 14 and 15 and has an overall length of 70 mm and a plate thickness of 1.8 mm, and a length L from an end portion of the welding portion (joining hole 12a) on a side facing the quenched portion of the first member 11 to an end portion of the second member 12 on a side facing the quenched portion of the first member 11 is 24 mm. As shown in FIG. 2, in order to completely restrain one end portion of the second member 12 and to cause bending deformation of the member, velocity of 1,000 mm/s was imparted for forced displacement at the other end portion of the first member 11.

Figure 3:
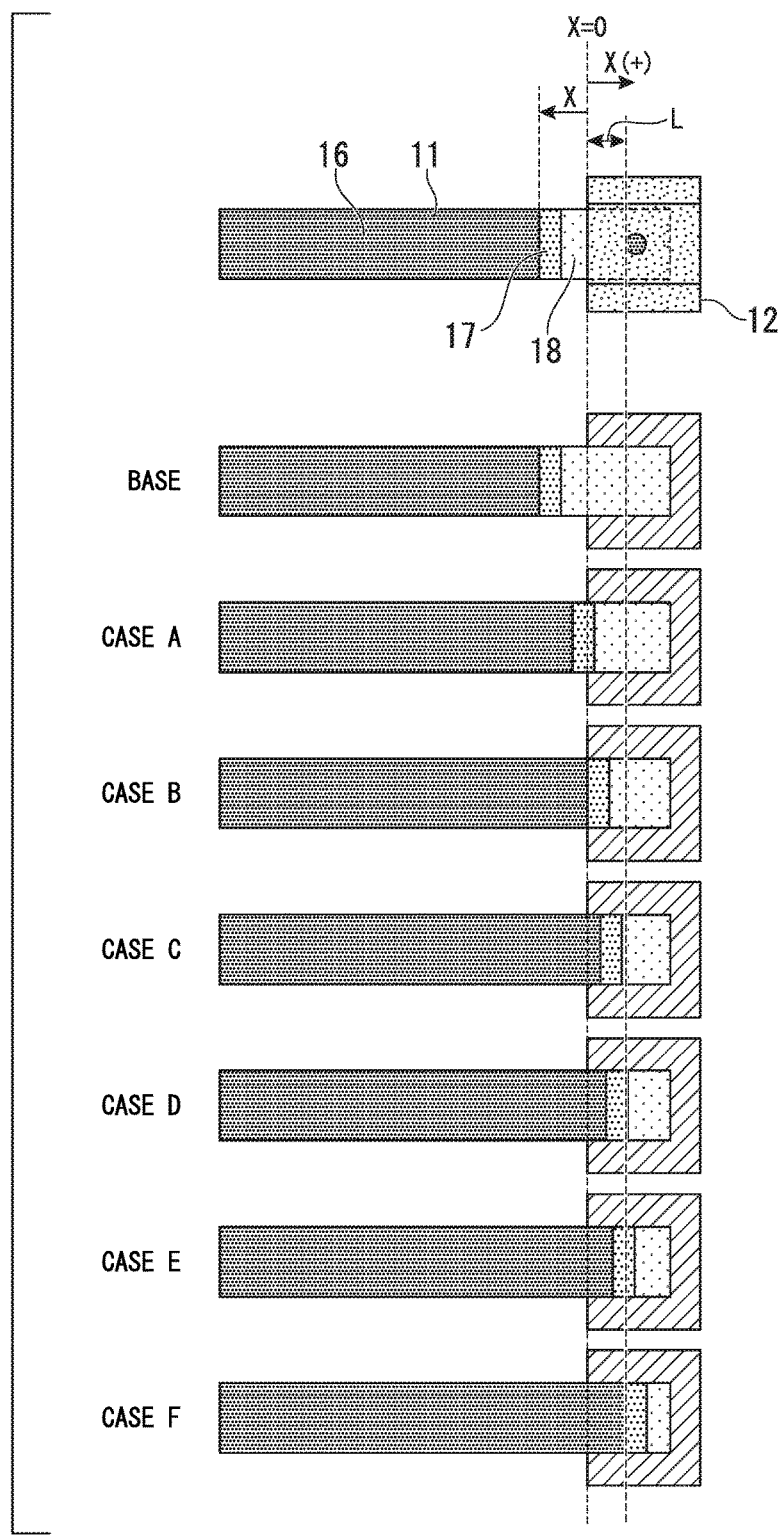
FIG. 3 is an illustration collectively showing analyzed cases (Base and Cases A to F).

FIG. 3 and Table 1 collectively show analyzed cases (Base and Cases A to F). In FIG. 3, the reference symbol 16 indicates a quenched portion in the first member 11, the reference symbol 17 indicates a transition portion in the first member 11, and the reference symbol 18 indicates a base material portion in the first member 11.

The length of the transition portion 17 in one direction in the first member 11 was set to 12 mm. As shown in FIG. 3, a length X is indicated by the coordinates to the one direction as the origin position of the end portion of the second member 12 on the side facing the quenching portion of the first member 11.

In FIG. 3, Base indicates a case where both the quenched portion 16 and the transition portion 17 do not overlap the second member 12, and Cases A and B indicate cases where a part of the transition portion 17 overlaps the second member 12. Cases C to F indicate cases where the transition portion 17 overlaps the second member 12, and the overlapping margin between the quenched portion 16 and the second member is increased in order from Case C to Case F.

Figure 4:
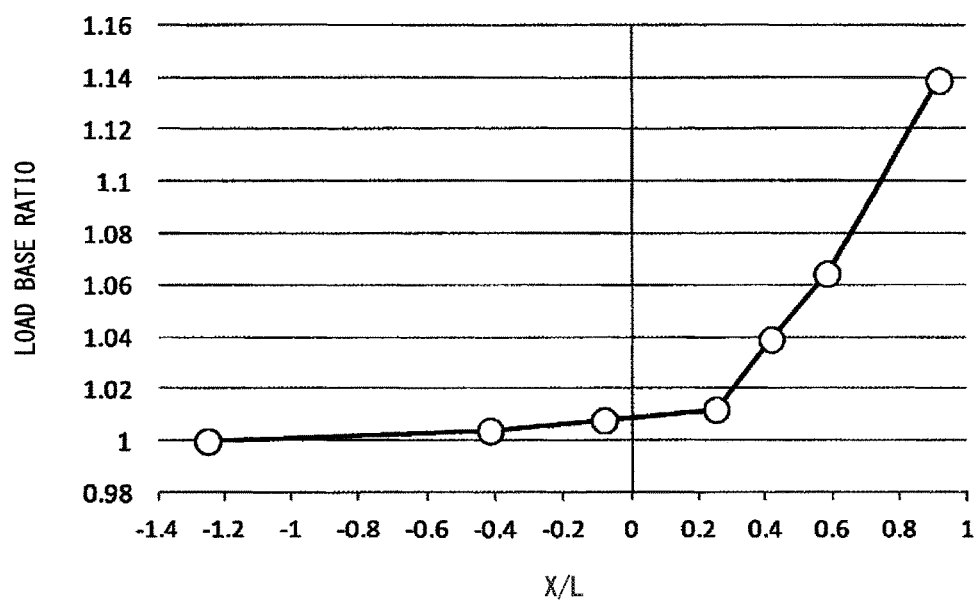
FIG. 4 is a graph collectively showing analysis results of the analyzed cases (Base and Cases A to F).

FIG. 4 and Table 1 collectively show analysis results of the analyzed cases (Base and Cases A to F). The performance evaluation was performed with a load in a direction in which displacement was applied, and the maximum value of the load applied to the fixed boundary was used. The load base ratio of the vertical axis in the graph of FIG. 4 is a ratio in which Base is 1.

Figure 5:
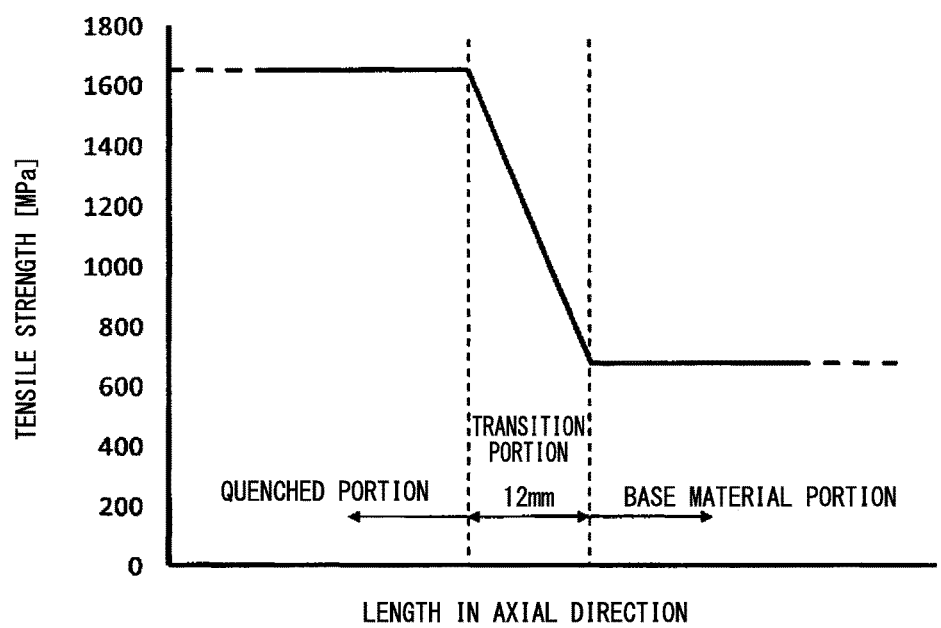
FIG. 5 is a graph showing a tensile strength distribution of the quenched portion, the transition portion, and the base material portion.

FIG. 5 is a graph showing tensile strength distribution of the quenched portion 16, the transition portion 17, and the base material portion 18.

As shown in FIG. 4 and Table 1, a length of the quenched portion of the first member 11 was described as an overlapping margin between the second member 12 and the quenched portion of the first member 11 by the lengths L and X.

As shown in FIG. 4 and Table 1, it is found that in a case where a ratio (X/L) is 0.25 or greater, load performance is dramatically improved and a joint structure in which the quenched portion 16 is overlapped is required. In addition, it is found that it is more effective to form the welding portion 13 in the transition portion 17 as in Cases E and F.

Due to the above reasons, the welding portion 13 exists only in the transition portion 17 or the base material portion 18. Particularly, the ratio (X/L) of the length X (mm) from the end portion of the second member 12 on the side facing the quenched portion 16 of the first member 11 to the quenched portion 16 of the first member 11 to the length L (mm) from the end portion of the welding portion 12a on the side facing the quenched portion 16 of the first member 11 to the end portion of the second member 12 on the side facing the quenched portion 16 of the first member 11 is preferably 0.25 or greater.

TABLE 1

| REFERENCE SYMBOL | X [mm] | X/L | LOAD BASE RATIO |
| --- | --- | --- | --- |
| BASE | −30 | −1.25 | 1.000 |
| A | −10 | −0.42 | 1.004 |
| B | −2 | −0.08 | 1.008 |
| C | 6 | 0.25 | 1.012 |
| D | 10 | 0.42 | 1.039 |
| E | 14 | 0.58 | 1.064 |
| F | 22 | 0.92 | 1.139 |

BRIEF DESCRIPTION OF THE REFERENCE SYMBOLS

10: JOINING STRUCTURE FOR MEMBER IN VEHICLE BODY
11: FIRST MEMBER
11a: EXTERNAL SURFACE
11-1 to 11-4: SIDE
12: SECOND MEMBER
12a: JOINING HOLE
13: WELDING PORTION
14: THIRD MEMBER
14a: OUTWARD FLANGE
15: FOURTH MEMBER
16: QUENCHED PORTION
17: TRANSITION PORTION
18: BASE MATERIAL PORTION

The invention claimed is:
1. A joining structure for a member in a vehicle body comprising:

a first member made of steel, extending in one direction, having a closed hollow cross-section that is free of an outwardly-extending flange, the first member including:

a quenched portion having a tensile strength of 1,470 MPa or greater, a base material portion having a tensile strength of less than 700 MPa, and a transition portion between the quenched portion and the base material portion in which a tensile strength gradually changes from the tensile strength of the quenched portion to the tensile strength of the base material portion;

a second member made of steel and only partially overlapping an external surface of the first member by an overlapping portion, and an edge of the second member is on the quenched portion, the first member and the second member welded to each other in the overlapping portion, and the overlapping portion overlapping the first member from the quenched portion through the transition portion and over the base material portion; and a welding portion formed by the welding existing in the transition portion or the base material portion in the first member.

2. The joining structure for a member in a vehicle body according to claim 1, wherein a ratio (X/L) of a length (X) mm to a length (L) mm is 0.25 or greater, the length (X) mm being a length from an end portion of the second member on a side facing the quenched portion of the first member to an end portion of the quenched portion of the first member in the one direction, the length (L) mm being a length from an end portion of the welding portion on a side facing the quenched portion of the first member to the end portion of the second member on the side facing the quenched portion of the first member, and the length (X) is indicated by the coordinates to the one direction as the origin position of the end portion of the second member on the side facing the quenching portion of the first member.

3. The joining structure for a member in a vehicle body according to claim 1, wherein the welding portion is an arc welding portion, a laser welding portion, or a resistance spot welding portion.

4. The joining structure for a member in a vehicle body according to claim 1, wherein the first member has a rectangular cross-sectional shape, and the second member is formed of a third member having a hat-shaped cross-section overlapping three sides of the first member and a fourth member joined to overlap two flanges of the third member and overlapping the remaining one side of the first member.

5. The joining structure for a member in a vehicle body according to claim 1, wherein the second member has a joining hole that is a work hole for a case where the welding portion is formed.

6. The joining structure for a member in a vehicle body according to claim 1, wherein the first member is manufactured by three-dimensional hot bending and quenching.

* * * * *